(12) United States Patent
Kang

(10) Patent No.: US 12,167,148 B2
(45) Date of Patent: Dec. 10, 2024

(54) IMAGE PROCESSING METHOD AND APPARATUS

(71) Applicant: SAMSUNG ELECTRONICS CO., LTD., Suwon-si (KR)

(72) Inventor: Deokyoung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 326 days.

(21) Appl. No.: 17/459,183

(22) Filed: Aug. 27, 2021

(65) Prior Publication Data

US 2022/0272307 A1 Aug. 25, 2022

(30) Foreign Application Priority Data

Feb. 25, 2021 (KR) .................. 10-2021-0025238

(51) Int. Cl.
*H04N 23/84* (2023.01)
*H04N 9/68* (2023.01)
*H04N 25/11* (2023.01)

(52) U.S. Cl.
CPC ............. *H04N 23/843* (2023.01); *H04N 9/68* (2013.01); *H04N 25/11* (2023.01)

(58) Field of Classification Search
CPC ........ H04N 23/843; H04N 25/11; H04N 9/68; H04N 25/134; H04N 23/13; H04N 23/60; H04N 23/81; H04N 23/951; H04N 25/133; H04N 25/135; G06T 3/4015; G06T 2207/10024; G06T 1/0007; G06T 11/001; G06T 2207/10016; G06T 2207/10068; G06T 2207/20024; G06T 2207/20216;

(Continued)

(56) References Cited

U.S. PATENT DOCUMENTS 10,909,728 B1 * 2/2021 Appalaraju ............... G06T 3/40
2017/0103497 A1 * 4/2017 Cao ....................... H04N 25/134
(Continued)

FOREIGN PATENT DOCUMENTS

CN 111612689 A * 9/2020 ............. G06T 11/00
KR 10-0932217 B1 12/2009
(Continued)

OTHER PUBLICATIONS

Chen et al., "Learning to See in the Dark," IEEE Conference on Computer Vision and Pattern Recognition (CVPR) 2018, Jun. 2018 (10 total pages).

(Continued)

*Primary Examiner* — Antoinette T Spinks
(74) *Attorney, Agent, or Firm* — Sughrue Mion, PLLC

(57) ABSTRACT

An image processing method and apparatus are provided. The image processing method includes converting an input image to a first channel separated image having a same resolution as the input image, the first channel separated image comprising a plurality of separate channels, generating a second channel separated image by performing a convolution operation on the first channel separated image, the second channel separated image comprising the plurality of separate channels and having a same resolution as the first channel separated image, and generating a restored image corresponding to the input image based on the second channel separated image.

20 Claims, 5 Drawing Sheets

(58) Field of Classification Search
CPC .......... G06T 3/4007; G06T 5/00; G06T 5/20; G06T 5/50; G06T 7/0012; G06T 7/73; G06V 10/56
See application file for complete search history.

(56) References Cited

U.S. PATENT DOCUMENTS

| | | | |
|---|---|---|---|
| 2020/0234402 | A1 | 7/2020 | Schwartz et al. |
| 2022/0335663 | A1* | 10/2022 | Hill .......................... G06T 7/73 |
| 2023/0086070 | A1* | 3/2023 | Liu ......................... G06T 5/002 |

FOREIGN PATENT DOCUMENTS

| | | |
|---|---|---|
| KR | 10-1346942 B1 | 1/2014 |
| KR | 10-1692748 B1 | 1/2017 |
| KR | 10-1721632 B1 | 3/2017 |
| KR | 10-1723212 B1 | 4/2017 |

OTHER PUBLICATIONS

Gharbi et al., "Deep Joint Demosaicking and Denoising," Siggraph Asia 2016 Technical Papers, Dec. 5, 2016, (12 total pages).

* cited by examiner

IMAGE PROCESSING METHOD AND APPARATUS

CROSS-REFERENCE TO RELATED APPLICATION

This application claims priority to Korean Patent Application No. 10-2021-0025238, filed on Feb. 25, 2021, in the Korean Intellectual Property Office, the disclosure of which is incorporated by reference herein in its entirety.

BACKGROUND

1. Field

Methods and apparatuses consistent with example embodiments relate to an image processing method and apparatus.

2. Description of Related Art

Imaging devices, such as cameras, capture images using a single image sensor combined with a color filter array (CFA). These captured images may need to be processed so that the images are seen by people. When using the CFA to capture a color image, each pixel has information only for a single color, and as such, there is a need for technology for restoring color information of other colors.

Demosaicing is a digital image processing method that reconstructs an incomplete color sample output from a single image sensor combined with the CFA to a full color image.

A basic method of demosaicing may perform a linear interpolation to interpolate color information of an empty pixel using a weighted sum of neighboring color pixels.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an image processing method including: converting an input image to a first channel separated image having a same resolution as the input image, the first channel separated image comprising a plurality of separate channels; generating a second channel separated image by performing a convolution operation on the first channel separated image, the second channel separated image comprising the plurality of separate channels and having the same resolution as the first channel separated image; and generating an output image corresponding to the input image based on the second channel separated image.

The plurality of separate channels may correspond to colors of the input image.

The first channel separated image may preserve position information of pixels of the input image.

The first channel separated image may include a red channel including information associated with a red pixel of the input image, a green channel including information associated with a green pixel of the input image, and a blue channel including information associated with a blue pixel of the input image.

The red channel may include a pixel value of a red color pixel of the input image for a first pixel in the red channel corresponding to the red color pixel, and a reference value for a second pixel in the red channel corresponding to a pixel that is not the red color pixel among pixels of the input image, the green channel may include a pixel value of a green color pixel of the input image for a third pixel in the green channel corresponding to the green color pixel, and the reference value for a fourth pixel in the green channel corresponding to a pixel that is not the green color pixel among the pixels of the input image, and the blue channel may include a pixel value of a blue color pixel of the input image for a fifth pixel in the blue channel corresponding to the blue color pixel, and the reference value for a sixth pixel in the blue channel corresponding to a pixel that is not the blue color pixel among the pixels of the input image.

The converting may include separating a channel of a pixel of the input image into a channel corresponding to a color of the pixel and a channel not corresponding to the color of the pixel; and inputting a pixel value of the pixel to the channel corresponding to the color of the pixel, and inputting a reference value to the channel not corresponding to the color of the pixel.

The generating of the output image may include generating a third channel separated image by applying a mask to each color channel, among a plurality of color channels, comprised in the second channel separated image; and generating the output image by applying a maximum operation or a sum operation between the plurality of color channels comprised in the third channel separated image.

According to an aspect of an example embodiment, there is provided a non-transitory computer-readable storage medium storing instructions that, when executed by a processor, cause the processor to perform the image processing method.

According to an aspect of an example embodiment, there is provided an image processing apparatus including: a memory comprising instructions; and a processor configured to execute the instructions to: convert an input image to a first channel separated image having the same resolution as the input image, the first channel separated image comprising a plurality of separate channels; generate a second channel separated image by performing a convolution operation on the first channel separated image, the second channel separated image comprising the plurality of separate channels and the second channel separated image having the same resolution as the first channel separated image; and generate an output image corresponding to the input image based on the second channel separated image.

The plurality of separate channels may correspond to colors of the input image.

The first channel separated image may preserve position information of pixels of the input image.

The first channel separated image may include a red channel including information associated with a red pixel of the input image, a green channel including information associated with a green pixel of the input image, and a blue channel including information associated with a blue pixel of the input image.

The red channel may include a pixel value of a red color pixel of the input image for a first pixel in the red channel corresponding to the red color pixel, and a reference value for a second pixel in the red channel corresponding to a pixel that is not the red color pixel among pixels of the input image, the green channel may include a pixel value of a green color pixel of the input image for a third pixel in the green channel corresponding to the green color pixel, and the reference value for a fourth pixel in the green channel corresponding to a pixel that is not the green color pixel among the pixels of the input image, and the blue channel may include a pixel value of a blue color pixel of the input image for a fifth pixel in the blue channel corresponding to the blue color pixel, and the reference value for a sixth pixel in the blue channel corresponding to a pixel that is not the blue color pixel among the pixels of the input image.

The processor may be further configured to: separate a channel of a pixel of the input image into a channel corresponding to a color of the pixel and a channel not corresponding to the color of the pixel; and input a pixel value of the pixel to the channel corresponding to the color of the pixel, and input a value to the channel not corresponding to the color of the pixel.

The processor may be further configured to: generate a third channel separated image by applying a mask to each color channel, among a plurality of color channels, comprised in the second channel separated image; and generate the output image by applying a maximum operation or a sum operation between the plurality of color channels comprised in the third channel separated image.

According to an aspect of an example embodiment, there is provided an electronic apparatus, comprising: an image sensor; an image processing apparatus including: a memory comprising instructions; and a processor configured to execute the instructions to: convert an input image to a first channel separated image having the same resolution as the input image, the first channel separated image comprising a plurality of separate channels, generate a second channel separated image by performing a convolution operation on the first channel separated image, the second channel separated image comprising the plurality of separate channels and the second channel separated image having the same resolution as the first channel separated image, and generate an output image corresponding to the input image based on the second channel separated image; and a display device configured to display the output image generated by the image processing apparatus.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
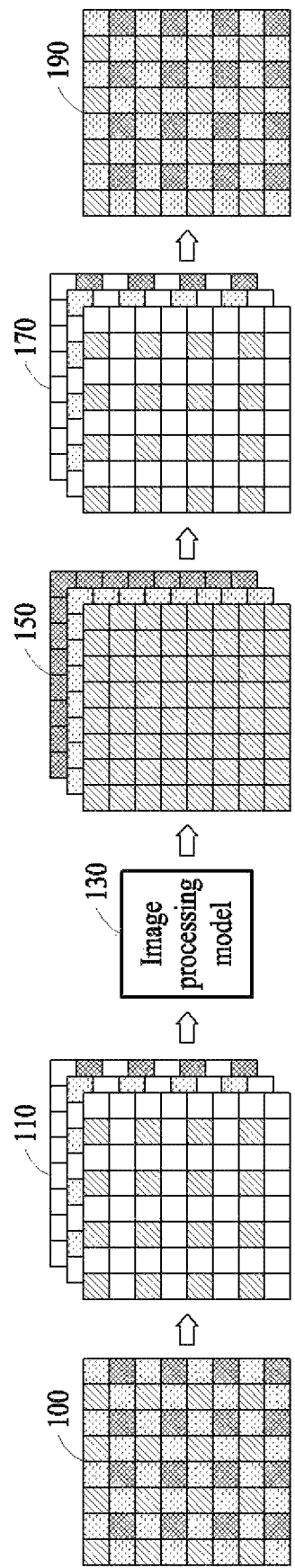
FIG. 1 illustrates an image processing method according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an image processing method according to an example embodiment.

The image processing method may be performed on an input image 100 captured through an image sensor. For example, the image processing method may perform, on the input image 100 output from a single image sensor, color conversion, denoising, super-resolution, deblurring, demoireing, or inpainting.

Using the image processing method, the input image 100 may be converted to a first channel separated image 110. The first channel separated image 110 may be input to an image processing model 130, and a second channel separated image 150 may be obtained as an output of the image processing model 130.

The input image 100 may be an image including information of one color for each pixel. Various colors may be included in the input image 100, and such colors may not be limited by number. For example, the input image 100 may be an incomplete color sample output from a single image sensor combined with a color filter array (CFA).

The input image 100 may be converted to the first channel separated image 110 having the same resolution as the input image 100 and in which each color channel is separated.

The input image 100 may be converted to the first channel separated image 110 as color information included in each pixel is separated into different color channels by color and a value is filled in an empty space of the separated color channels. A channel of a pixel included in the input image 100 may be separated into a channel corresponding to a color of the pixel and a channel not corresponding to the color. A pixel value of the pixel may be input to the channel corresponding to the color, and a value may be input to the channel not corresponding to the color. The value input to the channel not corresponding to the color may be a reference value. According to an example embodiment, the value input to the channel not corresponding to the color may be 0.

The first channel separated image 110 may have the same resolution as the input image 100, and thus pixels of the input image 100 and pixels of the first channel separated image 110 may correspond to each other one-to-one. The pixels of the first channel separated image 110 may include color information of the corresponding pixels of the input image 100, and thus preserve position information of the pixels of the input image 100.

The image processing model 130 may generate the second channel separated image 150 based on the first channel separated image 110. The image processing model 130 may generate the second channel separated image 150 by performing a convolution operation on the first channel separated image 110.

The second channel separated image 150 may be an image in which a plurality of channels is separated. For example, the second channel separated image 150 may be an image having the same resolution as the input image 100 and in which each color channel is separated. The second channel separated image 150 may not be limited to including a color channel corresponding to a color channel included in the first channel separated image 110. However, the second channel separated image 150 may include a different color channel from the first channel separated image 110 and also have a different number of channels from the first channel separated image 110. The image processing model 130 may be a convolutional neural network (CNN). The image processing model 130 may generate the second channel separated image 150 by performing the convolution operation and an activation function on the first channel separated image 110. For example, the image processing model 130 may be any one of a U-net, a residual neural network (ResNet), a LeNet, an AlexNet, VGGNets, a ReSeg, and a fully convolutional network (FCN). However, the image processing model 130 may not be limited thereto but be implemented in all forms of the CNN.

The image processing model 130 may be trained to perform image processing that a user selects or intends for the input image 100. For example, the image processing model 130 may be trained to perform color conversion, denoising, super-resolution, deblurring, demoireing, or inpainting on the input image 100.

An output image 190 may be generated based on the second channel separated image 150. According to an example embodiment, a third channel separated image 170 may be generated by applying a mask to the second channel separated image 150, and the output image 190 may be generated by applying an operation between color channels to the third channel separated image 170. For example, the third channel separated image 170 may be generated by applying a color filter mask to each color channel included in the second channel separated image 150, and the output image 190 may be generated by applying a maximum operation or a sum operation to the third channel separated image 170.

The output image 190 may be an image obtained by performing image processing intended by a user on the input image 100. For example, the output image 190 may be an image obtained by performing color conversion, denoising, super-resolution, deblurring, demoireing, or inpainting on the input image 100.

Figure 2:
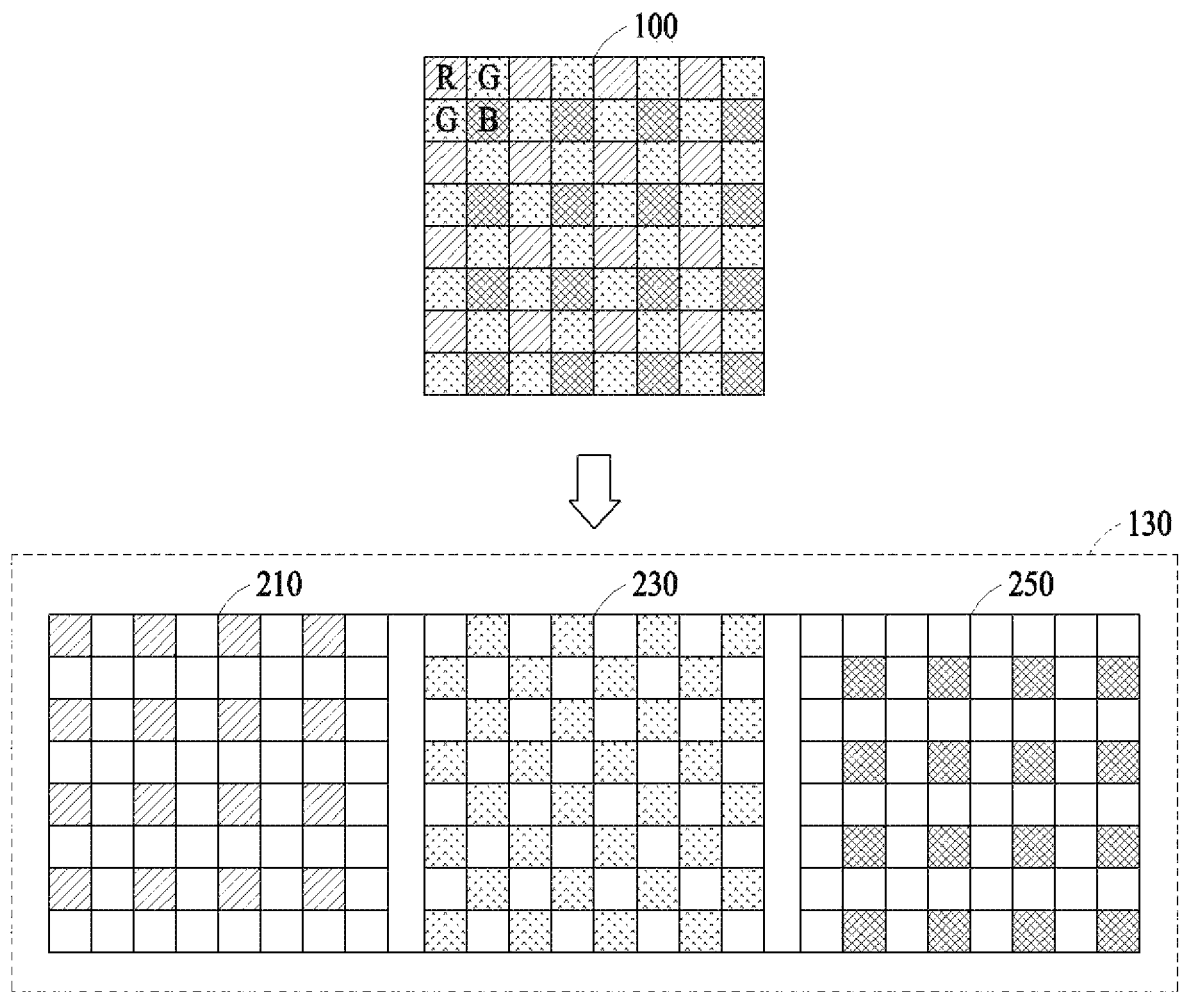
FIG. 2 illustrates a first channel separated image illustrated in FIG. 1.

FIG. 2 illustrates the first channel separated image 110 illustrated in FIG. 1.

The input image 100 may be converted to the first channel separated image 110. Although the input image 100 is illustrated in FIG. 2 as a Bayer pattern image in which a red pixel R, a green pixel G, and a blue pixel B are arranged, examples of which may not be limited thereto. The input image 100 may be an image including pixels of various colors, and the same input image converting operation described above may be performed on all input images including pixels of different colors. However, for the convenience of description, the first channel separated image 110 will be described hereinafter as being obtained through a conversion from the input image 100 including the red pixel R, the green pixel G, and the blue pixel B.

The first channel separated image 110 may include a red channel 210, a green channel 230, and a blue channel 250. The red channel 210, the green channel 230, and the blue channel 250 may have the same resolution as the input image 100.

The red channel 210 may include information associated with a red pixel R of the input image 100. A pixel of the red channel 210 corresponding to the red pixel R of the input image 100 may include a pixel value of the red pixel R. The red channel 210 may include 0 in a pixel not corresponding to the red pixel R. That is, the red channel 210 may have a value of zero for a pixel that is not the red pixel R.

The green channel 230 may include information associated with a green pixel G of the input image 100. The green channel 230 may include a pixel value of the green pixel G in a pixel corresponding to the green pixel G. The green channel 230 may include 0 in a pixel corresponding to a pixel other than the green pixel G. That is, the green channel 230 may have a value of zero for a pixel that is not the green pixel G.

The blue channel 250 may include information associated with a blue pixel B of the input image 100. The blue channel 250 may include a pixel value of the blue pixel B in a pixel corresponding to the blue pixel B. The blue channel 250 may include 0 in a pixel not corresponding to the blue pixel B. That is, the blue channel 250 may have a value of zero for a pixel that is not the blue pixel B.

Figure 3A:
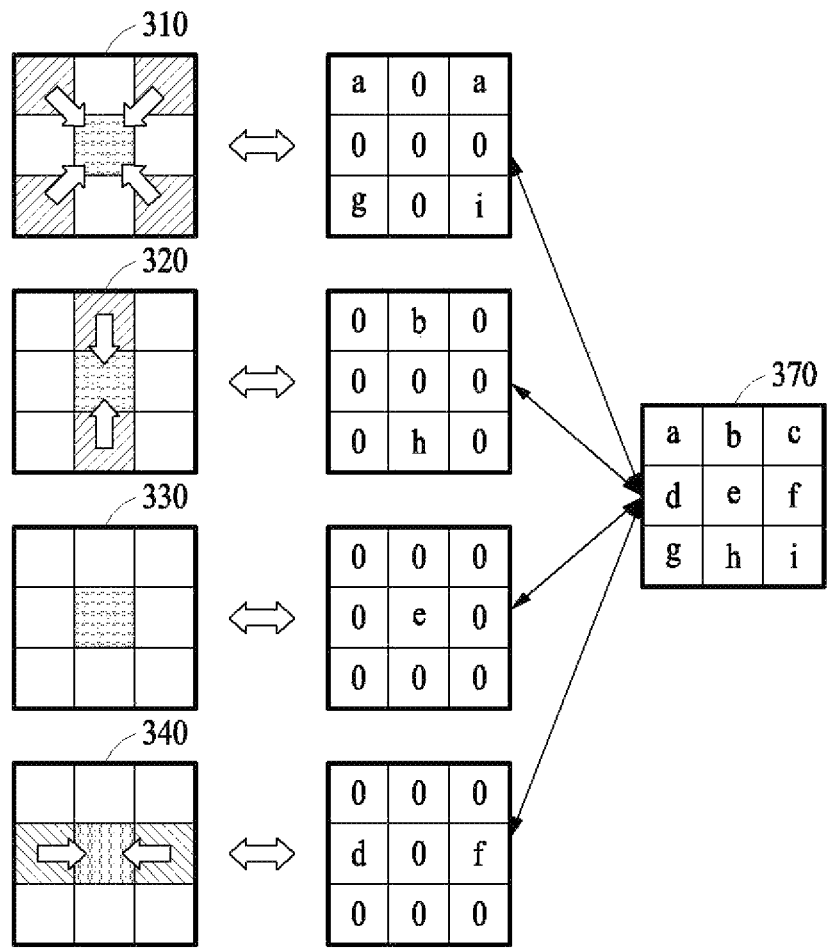
FIGS. 3A and 3B illustrate an effect of the image processing method illustrated in FIG. 1.
Figure 3B:
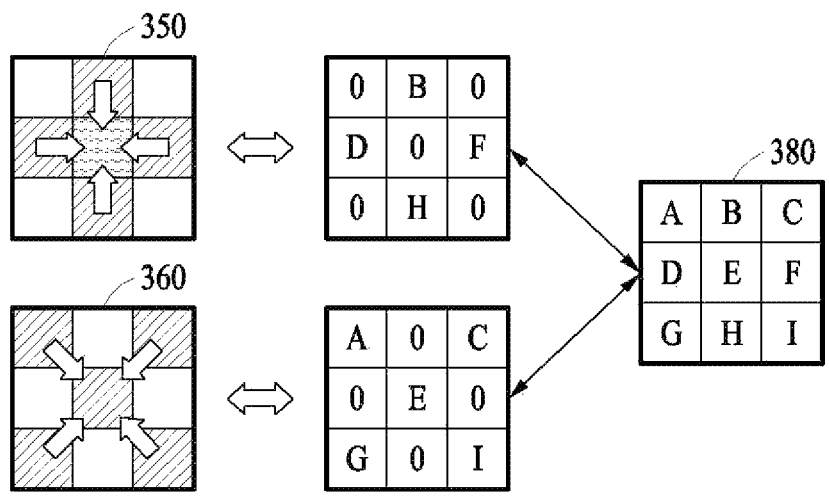

FIGS. 3A and 3B illustrate an effect of the image processing method illustrated in FIG. 1.

Using an image restoring method, a first convolution layer of the image processing model 130 may have a bilinear interpolation effect. Since 0 included in each channel may not be used as an input for the convolution operation, the image processing model 130 may perform an interpolation operation when only one 3×3 kernel is learned for each channel.

FIG. 3A illustrates an example of applying a 3×3 convolution operation to 3×3 patterns, for example, patterns 310, 320, 330 and 340, in a red channel and a blue channel. When a kernel 370 is applied to the 3×3 pattern 310, parameters a, c, g, and i may be applied, and parameters b, d, e, f, and h may not be applied. When the kernel 370 is applied to the 3×3 pattern 320, parameters b and h may be applied, and parameters a, c, d, e, f, g, and h may not be applied. When the kernel 370 is applied to the 3×3 pattern, a parameter e may be applied, and parameters a, b, c, d, f, g, h, and i may not be applied. When the kernel 370 is applied to the 3×3 pattern 340, parameters d and f may be applied, and parameters a, b, c, e, g, h, and i may not be applied. Thus, the convolution operation may be performed in the same way as the interpolation operation is performed on each of the 3×3 patterns 310, 320, 330 and 340.

FIG. 3B illustrates an example of applying a 3×3 convolution operation to 3×3 patterns, for example, patterns 350 and 360, in a green channel. When a kernel 380 is applied to the 3×3 pattern 350, parameters B, D, F, and H may be applied, and parameters A, C, E, G, and I may not be applied. When the kernel 380 is applied to the 3×3 pattern 360, parameters B, D, F, and H may be applied, and parameters A, C, E, G, and I may not be applied. Thus, the convolution operation may be performed in the same way as the interpolation operation is performed on each of the 3×3 patterns 350 and 360.

The image processing model 130 may perform an image restoring operation based on an activation layer and a plurality of convolution layers after a first convolution layer.

Figure 4:
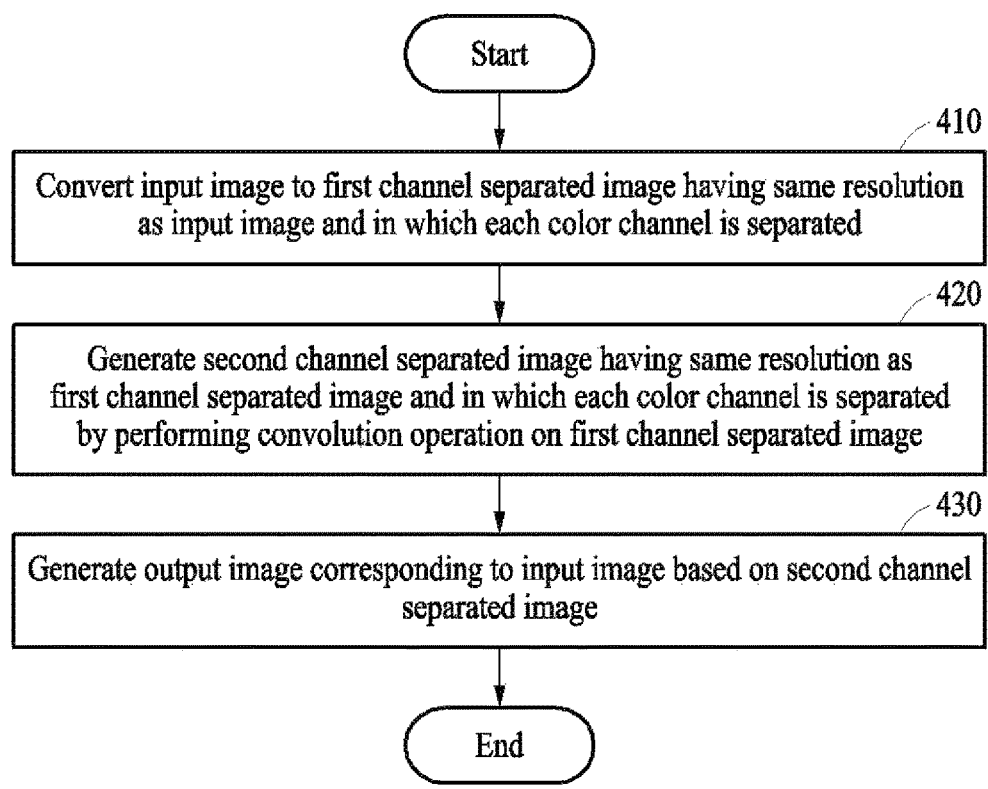
FIG. 4 illustrates a flowchart of the image processing method illustrated in FIG. 1.

FIG. 4 illustrates a flowchart of the image processing method illustrated in FIG. 1.

The image processing method may include operation 410 of converting an input image to a first channel separated image having the same resolution as the input image and in which each color channel is separated. In operation 410, the input image may be converted to the first channel separated image as color information included in each pixel may be separated into different channels for each color and a value may be filled in an empty space of the separated channels. The first channel separated image may include a red channel including information associated with a red pixel of the input image, a green channel including information associated with a green pixel of the input image, and a blue channel including information associated with a blue pixel of the input image. A space in which color information is missing in the red channel, the green channel, and the blue channel may be filled with 0.

The image processing method may include operation 420 of generating a second channel separated image having the same number of channels as the first channel separated image by performing a convolution operation on the first channel separated image. In operation 420, the first channel separated image may be input to an image processing model. The image processing model may be a CNN including a convolution layer and an activation layer. The image processing model may generate the second channel separated image based on the input first channel separated image.

The image processing method may include operation 430 of generating an output image corresponding to the input image based on the second channel separated image. In operation 430, a third channel separated image may be generated by applying a mask on each color channel included in the second channel separated image, and the output image may be generated by applying a maximum operation or a sum operation between color channels included in the third channel separated image.

For a more detailed description of the operations described above with reference to FIG. 4, reference may be made to what is described above with reference to FIGS. 1 through 3B.

Figure 5:
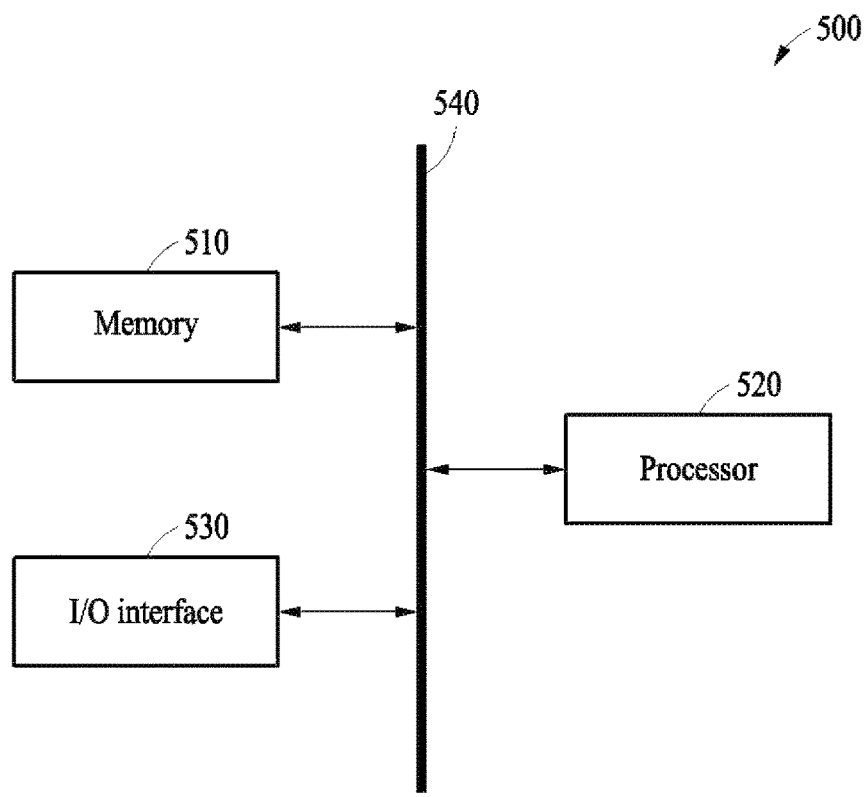
FIG. 5 illustrates a configuration of an image processing apparatus according to an example embodiment.

FIG. 5 illustrates a configuration of an image processing apparatus according to an example embodiment.

An image processing apparatus 500 may include a memory 510, a processor 520, and an input and output (I/O) interface 530. The memory 510, the processor 520, and the I/O interface 530 may be connected to one another through a bus 540.

The memory 510 may store instructions (or a program) executable by the processor 520. For example, the instructions may include instructions for executing an operation of the processor 520 and/or instructions for performing an operation of each component of the processor 520.

The memory 510 may be implemented in a volatile or non-volatile memory device. The volatile memory device may be implemented as a dynamic random-access memory (DRAM), a static RAM (SRAM), a thyristor RAM (T-RAM), a zero capacitor RAM (Z-RAM), or a twin transistor RAM (TTRAM). The non-volatile memory device may be implemented as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

The memory 510 may store a matrix on which an operation included in a neural network is to be performed. The memory 510 may store an operation result generated by processing of the processor 520.

The processor 520 may process data stored in the memory 510. The processor 520 may execute a computer-readable code (e.g., software) stored in the memory 510 and instructions induced by the processor 520.

The processor 520 may be a hardware-implemented data processing device having a physically structured circuit for executing desired operations. For example, the desired operations may include instructions or a code in a program.

For example, the hardware-implemented data processing device may include a central processing unit (CPU), a graphics processing unit (GPU), a neural processing unit (NPU), a multi-core processor, a multiprocessor, an application-specific integrated circuit (ASIC), and a field-programmable gate array (FPGA).

The image processing method described with reference to FIGS. 1 through 4 may be performed by the processor 520 of the image processing apparatus 500.

The image processing apparatus 500 may exchange data with an external device through the I/O interface 530. For example, the image processing apparatus 500 may exchange data with an image sensor, a database in which training data is stored, and/or a display device configured to display a restored image, through the I/O interface 530.

The image processing apparatus 500 may be implemented as a part of various computing devices including, for example, a smartphone, a wearable device, a personal digital assistant (PDA), a tablet personal computer (PC), a laptop computer, a smart home appliance such as a smart television (TV), a smart vehicle, a kiosk, and the like.

Figure 6:
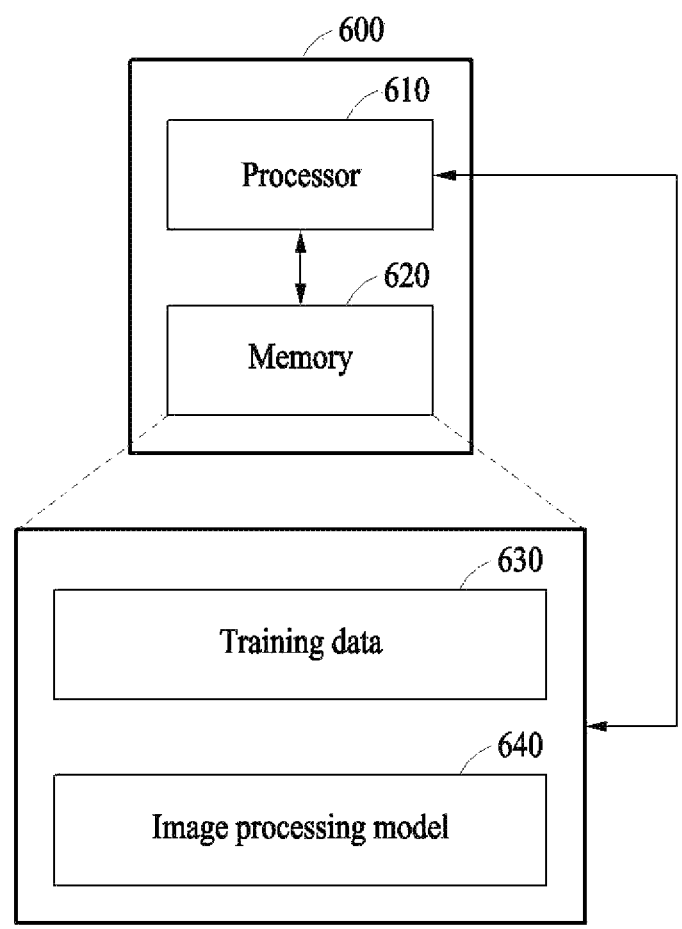
FIG. 6 illustrates a configuration of an image processing model training apparatus according to an example embodiment.

FIG. 6 illustrates a configuration of an image processing model training apparatus according to an example embodiment.

A training apparatus 600 may include a processor 610 and a memory 620.

The processor 610 may load training data 630 and an image processing model 640 from the memory 620. The training data 630 may be a dataset in which an input image and an image obtained through image processing intended by a user in response to the input image are matched. For example, the dataset may include data in which the input image and an image obtained through color conversion, denoising, super-resolution, deblurring, demoireing, or inpainting are matched.

The processor 610 may train the image processing model 640 such that it generates an output image based on the input image using the training data 630. The output image may be the image obtained through image processing intended by the user in response to the input image.

The processor 610 may convert the input image in the training data 630 to a first channel separated image and input to the first channel separated image to the image processing model 640. The processor 610 may generate the output image by applying a mask and a maximum operation or a sum operation on a second channel separated image that is output by the image processing model 640, and update a parameter of the image processing model 640 so that a difference is minimized between the output image and the image obtained through image processing that is included in the training data 630.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The foregoing embodiments are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An image processing method comprising:
converting an input image to a first channel separated image having a same resolution as the input image, the first channel separated image comprising a plurality of separate channels;
generating a second channel separated image by performing a convolution operation on the first channel separated image, the second channel separated image comprising the plurality of separate channels and having a same resolution as the first channel separated image; and
generating an output image corresponding to the input image based on the second channel separated image.

2. The image processing method of claim 1, wherein the plurality of separate channels of the first channel separated image corresponds to colors of the input image.

3. The image processing method of claim 1, wherein the first channel separated image preserves position information of pixels of the input image.

4. The image processing method of claim 1, wherein the plurality of separate channels of the first channel separated image comprises a red channel comprising information associated with a red pixel of the input image, a green channel comprising information associated with a green pixel of the input image, and a blue channel comprising information associated with a blue pixel of the input image.

5. The image processing method of claim 4, wherein the red channel comprises a pixel value of a red color pixel of the input image for a first pixel in the red channel corresponding to the red color pixel, and a reference value for a second pixel in the red channel corresponding to a pixel that is not the red color pixel among pixels of the input image, the green channel comprises a pixel value of a green color pixel of the input image for a third pixel in the green channel corresponding to the green color pixel, and the reference value for a fourth pixel in the green channel corresponding to a pixel that is not the green color pixel among the pixels of the input image, and the blue channel comprises a pixel value of a blue color pixel of the input image for a fifth pixel in the blue channel corresponding to the blue color pixel, and the reference value for a sixth pixel in the blue channel corresponding to a pixel that is not the blue color pixel among the pixels of the input image.

6. The image processing method of claim 1, wherein the converting comprises:

separating a channel of a pixel of the input image into a channel corresponding to a color of the pixel and a channel not corresponding to the color of the pixel; and inputting a pixel value of the pixel to the channel corresponding to the color of the pixel, and inputting a reference value to the channel not corresponding to the color of the pixel.

7. The image processing method of claim 1, wherein the generating of the output image comprises:

generating a third channel separated image by applying a mask to each color channel, among a plurality of color channels, comprised in the second channel separated image; and generating the output image by applying a maximum operation or a sum operation between the plurality of color channels comprised in the third channel separated image.

8. A non-transitory computer-readable storage medium storing instructions that, when executed by a processor, cause the processor to perform the image processing method of claim 1.

9. An image processing apparatus comprising:

a memory comprising instructions; and a processor configured to execute the instructions to:
convert an input image to a first channel separated image having the same resolution as the input image, the first channel separated image comprising a plurality of separate channels;

generate a second channel separated image by performing a convolution operation on the first channel separated image, the second channel separated image comprising the plurality of separate channels and having a same resolution as the first channel separated image; and generate an output image corresponding to the input image based on the second channel separated image.

10. The image processing apparatus of claim 9, wherein the plurality of separate channels corresponds of the first channel separated image corresponds to colors of the input image.

11. The image processing apparatus of claim 10, wherein the first channel separated image preserves position information of pixels of the input image.

12. The image processing apparatus of claim 9, wherein the plurality of separate channels of the first channel separated image comprises a red channel comprising information associated with a red pixel of the input image, a green channel comprising information associated with a green pixel of the input image, and a blue channel comprising information associated with a blue pixel of the input image.

13. The image processing apparatus of claim 12, wherein the red channel comprises a pixel value of a red color pixel of the input image for a first pixel in the red channel corresponding to the red color pixel, and a reference value for a second pixel in the red channel corresponding to a pixel that is not the red color pixel among pixels of the input image, the green channel comprises a pixel value of a green color pixel of the input image for a third pixel in the green channel corresponding to the green color pixel, and the reference value for a fourth pixel in the green channel corresponding to a pixel that is not the green color pixel among the pixels of the input image, and the blue channel comprises a pixel value of a blue color pixel of the input image for a fifth pixel in the blue channel corresponding to the blue color pixel, and the reference value for a sixth pixel in the blue channel corresponding to a pixel that is not the blue color pixel among the pixels of the input image.

14. The image processing apparatus of claim 9, wherein the processor is further configured to:

separate a channel of a pixel of the input image into a channel corresponding to a color of the pixel and a channel not corresponding to the color of the pixel; and input a pixel value of the pixel to the channel corresponding to the color of the pixel, and input a value to the channel not corresponding to the color of the pixel.

15. The image processing apparatus of claim 9, wherein the processor is further configured to:

generate a third channel separated image by applying a mask to each color channel, among a plurality of color channels, comprised in the second channel separated image; and generate the output image by applying a maximum operation or a sum operation between the plurality of color channels comprised in the third channel separated image.

16. An electronic apparatus comprising:

an image sensor;

an image processing apparatus comprising:
a memory comprising instructions; and
a processor configured to execute the instructions to:
convert an input image to a first channel separated image having the same resolution as the input image, the first channel separated image comprising a plurality of separate channels, generate a second channel separated image by performing a convolution operation on the first channel separated image, the second channel separated image comprising the plurality of separate channels and having a same resolution as the first channel separated image, and generate an output image corresponding to the input image based on the second channel separated image; and a display device configured to display the output image generated by the image processing apparatus.

17. The image processing apparatus of claim 16, wherein the plurality of separate channels corresponds of the first channel separated image corresponds to colors of the input image.

18. The electronic apparatus of claim 17, wherein the first channel separated image preserves position information of pixels of the input image.

19. The electronic apparatus of claim 16, wherein the plurality of separate channels of the first channel separated image comprises a red channel comprising information associated with a red pixel of the input image, a green channel comprising information associated with a green pixel of the input image, and a blue channel comprising information associated with a blue pixel of the input image.

20. The electronic apparatus of claim 19, wherein the red channel comprises a pixel value of a red color pixel of the input image for a first pixel in the red channel corresponding to the red color pixel, and a reference value for a second pixel in the red channel corresponding to a pixel that is not the red color pixel among pixels of the input image, the green channel comprises a pixel value of a green color pixel of the input image for a third pixel in the green channel corresponding to the green color pixel, and the reference value for a fourth pixel in the green channel corresponding to a pixel that is not the green color pixel among the pixels of the input image, and the blue channel comprises a pixel value of a blue color pixel of the input image for a fifth pixel in the blue channel corresponding to the blue color pixel, and the reference value for a sixth pixel in the blue channel corresponding to a pixel that is not the blue color pixel among the pixels of the input image.

\* \* \* \* \*